United States Patent [19]
VanBreemen

[11] Patent Number: 4,544,946
[45] Date of Patent: Oct. 1, 1985

[54] VERTICAL COLOR SHIFT CORRECTION IN A REAR PROJECTION TELEVISION SCREEN

[75] Inventor: Bertram VanBreemen, Indianapolis, Ind.

[73] Assignee: RCA Corporation, Princeton, N.J.

[21] Appl. No.: 487,383

[22] Filed: Apr. 21, 1983

[51] Int. Cl.$^4$ .............................................. H04N 9/31
[52] U.S. Cl. ....................................... 358/60; 358/231
[58] Field of Search ................... 358/60, 64, 231, 237, 358/238, 239; 350/128

[56] References Cited

U.S. PATENT DOCUMENTS

| | | | |
|---|---|---|---|
| 3,634,617 | 1/1972 | Welford | 358/60 |
| 4,034,907 | 10/1977 | Itoh | 358/60 |
| 4,163,990 | 8/1979 | Hodges | 358/64 |
| 4,210,928 | 7/1980 | Ohmori et al. | 358/60 |
| 4,432,010 | 2/1984 | Oguino | 358/60 |

Primary Examiner—Michael A. Masinick
Attorney, Agent, or Firm—Paul J. Rasmussen; Joseph Laks; Scott J. Stevens

[57] ABSTRACT

A rear projection television receiver incorporates red, green and blue-image producing kinescopes and a screen which includes a prism lens arrangement. The prism lens comprises a number of prism lens elements made up of a plurality of lens surfaces or facets. The prism lens forms the vertical audience envelope of the screen, which results from a combination of the vertical audience envelope contributed by the differently angled facets. Planes normal to the horizontal centerline of the faceplates of the red and blue image-producing kinescopes are displaced with respect to a plane normal to the horizontal centerline of the faceplate of the green image-producing kinescope in order to correct vertical color shift.

13 Claims, 13 Drawing Figures

VERTICAL COLOR SHIFT CORRECTION IN A REAR PROJECTION TELEVISION SCREEN

This invention relates to rear projection television receivers and in particular to rear projection screens which comprise a prism lens screen element.

Rear projection television receivers comprise screens which receive light from a video image source, such as one or more kinescopes, on the screen's rear surface and focus that light to form a viewable magnified version of the video image on the front surface of the screen. Before reaching the screen, light from the image source passes through a lens assembly disposed in the optical path of the image source, and may be reflected by a plurality of mirrors which provide the desired light ray path length within a compact structure.

The projection screen itself typically comprises a plurality of lens element layers, such as a field lens element which acts to substantially collimate the light from the video image source, and a focusing lens element, which focuses the collimated light onto an image surface on the front of the screen to form a viewable image. In a typical rear projection screen, the field lens comprises a circular Fresnel lens and the focusing lens comprises a plurality of vertically disposed lenticular lens elements, forming a lenticular lens array. The lenticular lens array may incorporate vertical black stripes between the lenticular lens elements in order to increase the screen contrast.

An additional function which is desirably performed by the screen is to enlarge the audience viewing envelope, i.e., that region in which the illumination provided by the screen is within acceptable viewing limits. This is typically defined as the region between the locations at which the screen brightness is 50% of that measured along the central light ray axis. The angle of view of the audience envelope in the horizontal direction is largely determined by the lenticular lens array, as a result of the choice of size and shape of the individual lenticular elements.

The audience envelope in the vertical direction may be provided by individual lenticular lens elements that provide both the horizontal and vertical audience envelopes, which form a type of "fly's eye" screen. It is more commonly provided and defined by the inclusion of a screen diffusion element or layer, which may comprise a separate screen element, or may comprise a diffusion coating applied to one of the other screen elements. The diffusion surface is desirably located between the Fresnel and lenticular lens array. The diffusion layer is designed to scatter the light rays sufficiently in order to produce a vertical audience envelope having an acceptable angle of view. However, with a screen that incorporates contrast-enhancing black stripes as part of the lenticular lens array, this diffusion layer also reduces the amount of light transmitted through the screen due to light absorption by the black stripes. This reduces the screen efficiency, which is undesirable in projection television receivers, where high screen brightness levels are difficult to obtain. A diffusion surface is desirable in all screens, including the previously described "fly's eye" screen, in order to reduce reflections from external light sources and reflections between the surfaces of the screen elements. The Fresnel lens, since it is not perfectly transparent, reflects some light from the image sources, primarily in areas away from the center of the screen. This results in the appearance of a bright disc or area at the center of the screen. A diffusion surface reduces the appearance of this bright area. The diffusion layer also scatters any stray light that reaches the screen directly from the image sources, which would otherwise be objectionably visible. It would be advantageous to provide a rear projection screen having the desired advantages of a diffusion surface without the disadvantage of screen efficiency reduction.

The vertical audience envelope or angle of view must be sufficiently large so that viewers of different heights in different viewing positions will still fall within the desired brightness region. With projection television receivers of the increasingly popular style in which the screen is close to the floor level, the eye level of most viewers will still be above the center of the screen. The vertically symmetrical light dispersion provided by the diffusion layer will therefore result in much of the screen light output being directed into the floor or to regions not ordinarily occupied by viewers.

In order to direct a significant portion of the light output from the screen into the normal viewing region, it is necessary to cause the vertical audience envelope to be angled upward with respect to a horizontal plane normal to the screen surface. This may be accomplished by the screen arrangement disclosed in U.S. Pat. No. 4,452,509, issued June 5, 1984, in the name of B. VanBreemen and entitled, "Projection Television Screen Having A Selected Audience Envelope", which describes a screen having a circular Fresnel lens element with its center vertically displaced or offset from the center of the viewable images in order to direct the vertical audience envelope at a positive angle with respect to the screen. The center axis offset requires the effective size of the Fresnel lens to be increased, which may increase the screen manufacturing complexity and cost. A screen incorporating a prism lens element is disclosed in a copending application entitled, "Rear Projection Television Screen Incorporating A Prism Lens", having Ser. No. 487,382 and filed April 21, 1983 in the name of B. VanBreemen and assigned to RCA Corporation, which describes a rear projection television screen having a multi-faceted prism lens element which provides greatly increased control over the position and angle of view of the vertical audience envelope, thereby allowing a simplified, less expensive receiver structure. The screen of that application also permits the removal of the normally required diffusion layer, resulting in a substantial increase in efficiency.

A rear projection television receiver incorporating a screen as disclosed in the previously described application may experience vertical shift of the individual color components due to the dispersive action of the elements of the prism lens. This vertical color shift may result in the appearance of color fringing on the screen.

In accordance with the present invention, in a rear projection television receiver incorporating a rear projection screen which comprises a field lens, a prism lens made up of a plurality of horizontally disposed prism lens elements incorporating facets, and a focusing lens for focusing light onto an image surface, a video image source comprises a plurality of horizontally aligned monochrome kinescopes each producing a video image on a faceplate. A plane normal to the horizontal centerline of the faceplate of at least one of the kinescopes is displaced with respect to a plane normal to the horizontal centerline of the faceplate of another of the kinescopes.

In the accompanying drawing, FIG. 1 is a side elevational view of a rear projection television receiver incorporating a screen constructed in accordance with the present invention;

Figure 1:
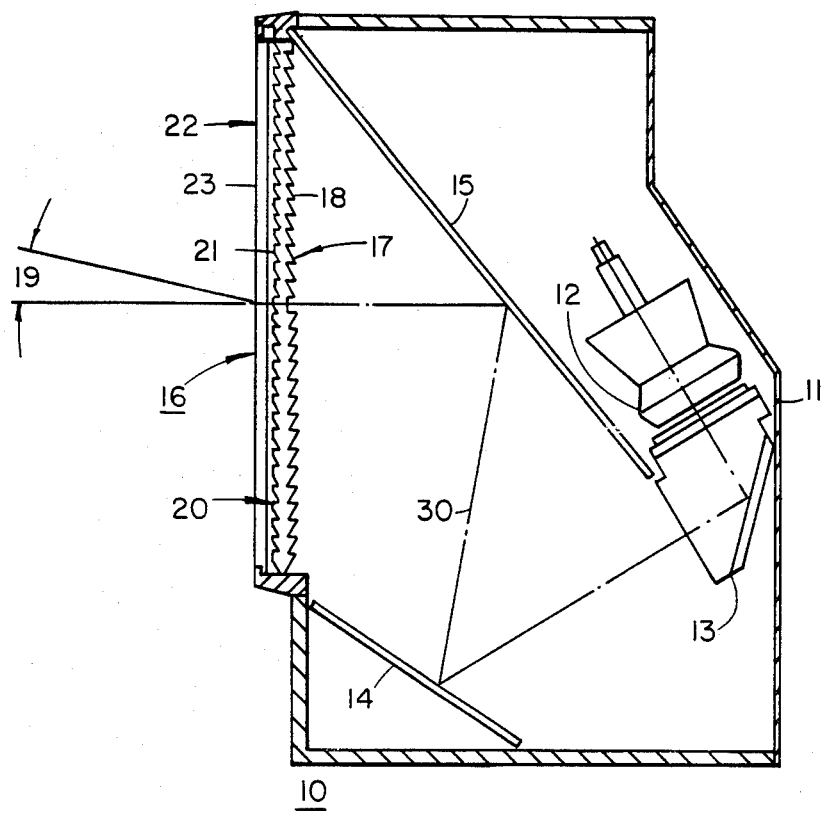

Referring to FIG. 1, there is shown a portion of a rear projection television receiver 10 incorporating a cabinet 11. Within cabinet 11 are disposed one or more video image sources, such as kinescope 12, of which only one is shown, which produces video images on a faceplate of the kinescope. Typically, for a color projection television, three kinescopes will be used, providing red, green and blue images, respectively, similar to the function of the red, green and blue designated electron guns in a conventional color kinescope. Adjacent to each of the kinescopes is a lens assembly 13 which provides the desired magnification of the kinescope images.

Light transmitted through lens assembly 13 is reflected by a minor mirror 14 and by a major mirror 15 which, through folding of the light path, provide the necessary light ray path length for the desired magnification in a compact cabinet.

Figure 2:
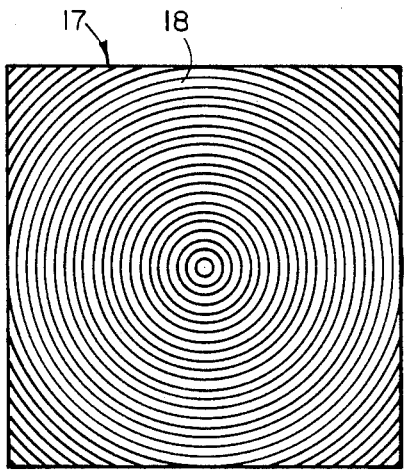
FIG. 2 is a rear elevational view of the projection television screen shown in FIG. 1.

The light reflected by major mirror 15 impinges on the rear of a screen assembly 16, which comprises a plurality of lenses having light controlling surfaces. Screen 16 incorporates a circular Fresnel field lens 17, such as shown in FIG. 2, which acts to substantially collimate the light from major mirror 15. Fresnel lens 17 may be formed of molded plastic, with the individual Fresnel elements 18 having a width of the order of 0.015 inches. The angle of the Fresnel elements determines the focal length of the lens.

Adjacent to the Fresnel lens 17 is a prism lens 20 for directing the light from Fresnel lens 17. Prism lens 20 has horizontally aligned prism elements 21 which, in accordance with the present invention, have a uniquely formed structure which will be described in detail later. The prism elements 21 also have widths of the order of 0.015 inches. The prism lens 20 may be formed as a separate layer of projection screen 16 or, preferably, it may be combined with Fresnel lens 17 as a single layer with, for example, the respective lens structures being molded on opposite sides of a plastic panel. Forming the Fresnel and prism lenses on one panel reduces the number of light reflecting surfaces and hence increases screen efficiency. The prism lens 20 acts to define the vertical audience envelope 19 in a manner which will be described later. It is possible to change the position of the Fresnel lens and the prism lens so that the prism lens acts on the light from the video image sources prior to the Fresnel lens.

Figure 3:
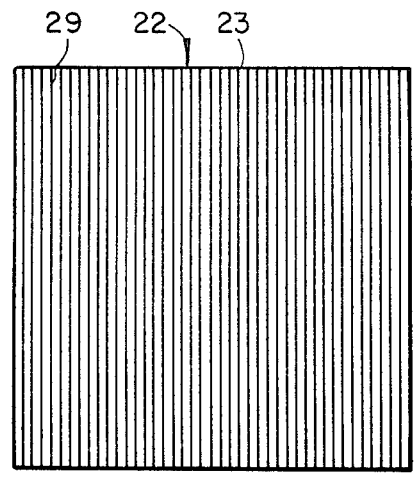
FIG. 3 is a front elevational view of the projection television screen shown in FIG. 1.
Figure 3A:
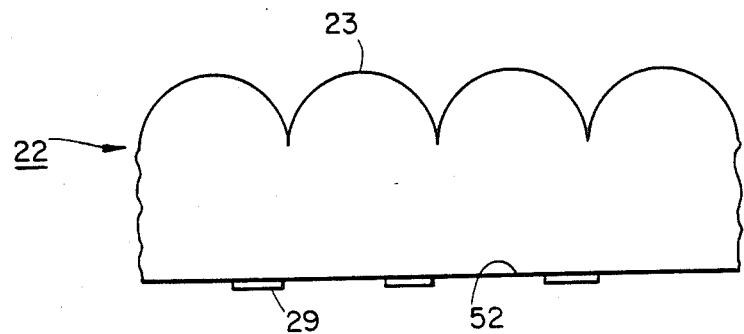
FIG. 3A is a top plan view of a portion of the projection television screen shown in FIG. 1.

Projection screen 16 also comprises a lenticular lens array 22, such as shown in FIGS. 3 and 3A, disposed adjacent to prism lens 20. Lenticular lens array 22 comprises a plurality of vertically oriented lenticular lens elements 23 which focus the light received from the image source 12 onto an image surface 52 so as to be viewable. The lenticular array may also be used to define the audience envelope in the horizontal plane, and may incoporate darkened regions 29 between the individual lenticular elements to increase the contrast of the projected image.

Figures 4, 4A, 7:
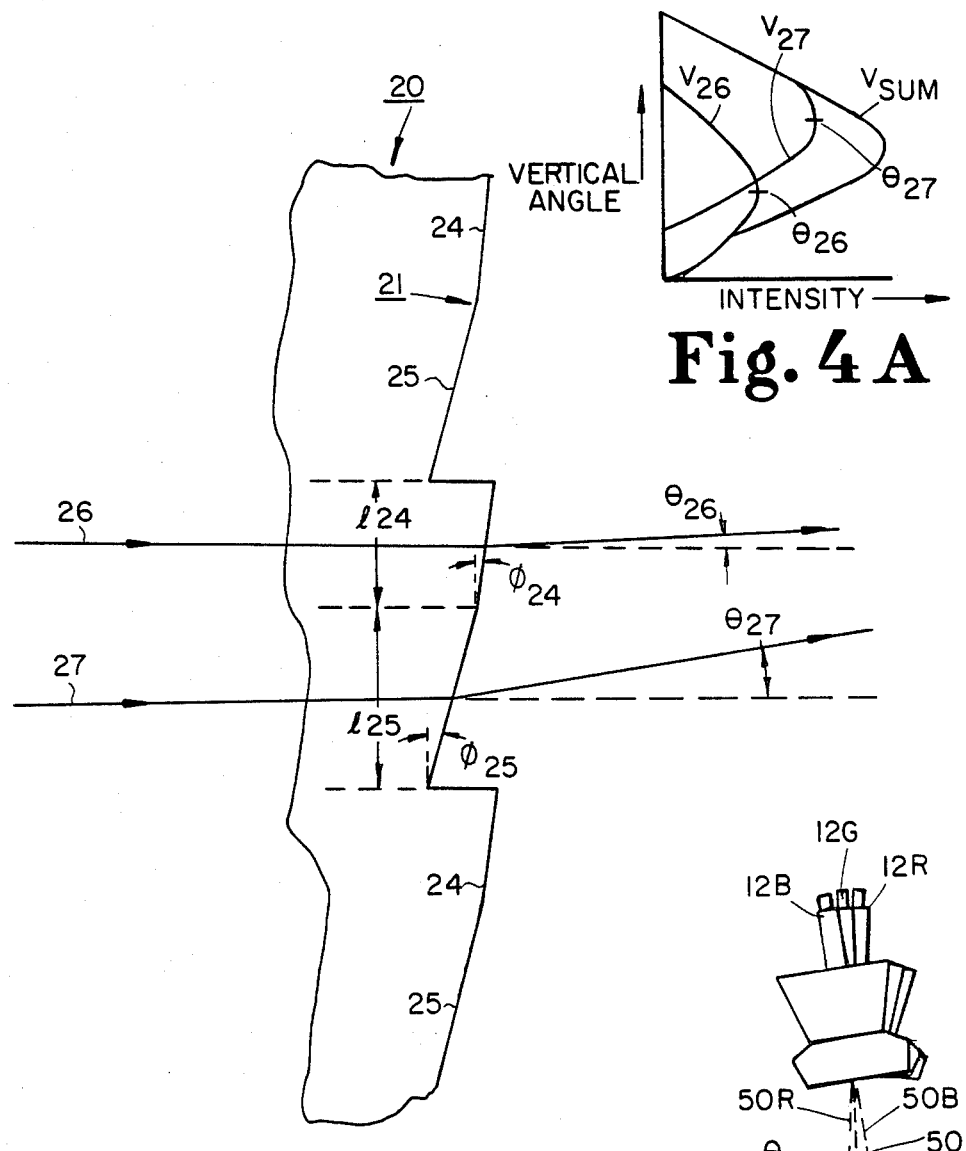
FIG. 4 is a side elevational view of a portion of the projection television screen shown in FIG. 1.
FIG. 4A is a graph illustrating the operation of the projection television screen shown in FIG. 1.
FIG. 7 is a side elevational view of an arrangement for positioning kinescopes of a rear projection television receiver in accordance with the present invention.

Referring to FIG. 4, there is shown an enlarged view of a portion of the prism lens 20 of the projection screen 16 shown in FIG. 1. In accordance with the present invention, each of the individual prism elements 21 comprise discrete facets or surfaces 24 and 25. Principal or central light rays 26 and 27 from image source 12, following a representative reflected ray path 30, as shown in FIG. 1, are collimated by Fresnel lens 17 and strike the front surface of facets 24 and 25 of the prism lens elements 21 of prism lens 20. Facets 24 and 24 are formed having different angles with respect to a vertical plane. Illustratively, facet 24 forms an angle, designated $\phi 24$, of approximately 8.5° with respect to the vertical, while facet 25 forms an angle, designated $\phi 25$, of approximately 16° with respect to the vertical. Facet 24 will impart an upward bend to the central ray 26 of an angle designated $\theta 26$, with the light bundle distributed symmetrically around the illustrated central ray. Facet 25 likewise imparts an upward bend to the illustrated central ray 27 of an angle designated $\theta 27$. FIG. 4A shows the light bundle intensity distribution for different vertical angles. The central ray occurs at the maximum intensity point. Each of the facets 24 and 25 will therefore form its own vertical audience envelope. The resultant vertical audience envelope for the entire screen is a sum of the light distribution from each of the facets 24 and each of the facets 25. This is shown in FIG. 4A by the curve $V_{SUM}$.

The vertical audience envelope of the screen may therefore be accurately controlled via the multifaceted prism lens of the present invention. By careful selection of the facet angles $\phi 24$ and $\phi 25$, and the relative size of the facets, illustrated in FIG. 4 by the dimension $l_{24}$ and $l_{25}$, the vertical audience envelope may be selected to have whatever shape is desired. Although prism lens 20 is illustratively shown as having two facets in each of the prism elements 21, prism elements having three or more facets may be made. Increasing the number of facets increases the control over the shape and light distribution of the vertical audience envelope.

Since the prism lens 20 performs the function of providing the desired vertical audience envelope, a screen diffusion layer is not required for this purpose. The prism lens will also reflect some light transmitted by Fresnel lens 17, which acts to reduce the appearance of bright spots at the center, caused by nonuniform Fresnel transmission, as previously described, or at other areas of the screen, caused by stray light from the image sources. The presence of prism lens 20 may therefore eliminate the need for a diffusion surface between the Fresnel and lenticular lens entirely, thereby greatly increasing the efficiency of the screen to an efficiency of the order of 71%.

Figure 3B:
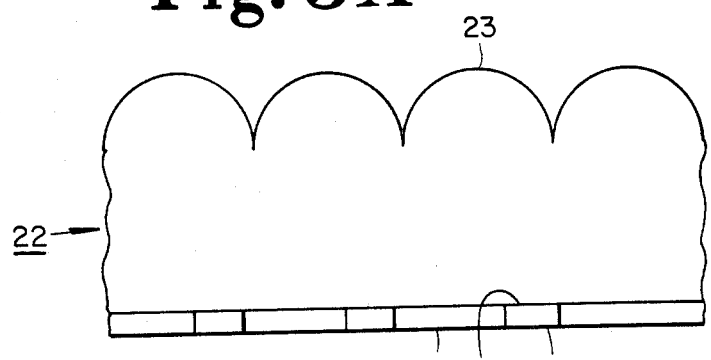
FIG. 3B is a top plan view of an alternate embodiment of a portion of a projection television screen.

Though not required for acceptable screen performance, a diffusion layer or surface 38, as shown in FIG. 3B, may be provided at the image surface of the lenticular lens array, in order to aid in determining the horizontal audience envelope and in increasing the screen contrast in the presence of ambient light by way of decreasing reflections. Such a diffusion surface may increase the screen contrast by a factor of 10 over a screen without such a diffusion surface. Since the diffusion is located at the image surface, diffused light is not absorbed by the screen black matrix stripes and therefore screen efficiency is not degraded. The diffusion surface may be formed, for example, by coating the screen or by providing roughening or texture to the screen surface.

Figure 5:
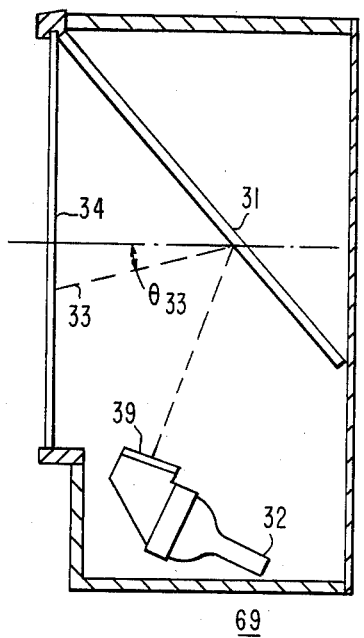
FIG. 5 is a side elevational view of an alternate embodiment of a rear projection television receiver incorporating a projection screen constructed in accordance with the present invention.
Figure 5A:
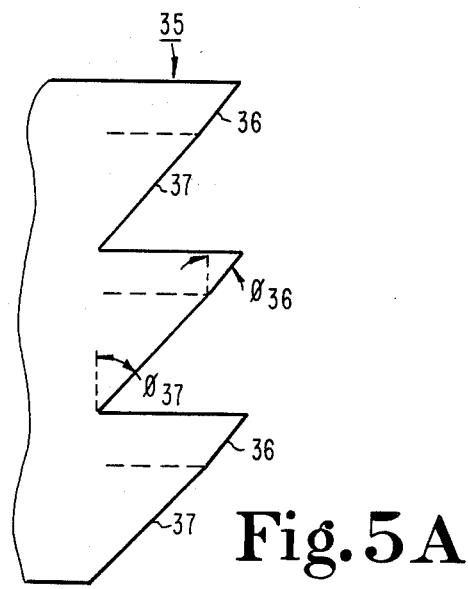
FIG. 5A is a side elevational view of a portion of the projection television screen shown in FIG. 5.

It is desirable to reduce the size of the projection television receiver cabinet in order to reduce manufacturing and shipping costs, and to reduce the obtrusive appearance of the receiver as furniture. Use of a compact projection lens assembly, manufactured by U.S. Precision Lens, permits the construction of a projection television receiver 69, as shown in FIG. 5, having only a single mirror 31. An efficient utilization of this advantageous design, however, requires that the central ray from the image sources 32 and lens assembly 39, represented by ray path 33, impinge on the screen 34 at an angle $\theta 33$ of the order of 12° below the horizontal. Conventional projection screens are unable to accept the image light rays at this angle, while still imparting the desired upward bend to the vertical audience envelope. Consequently, such receivers cannot easily be made in this cost and space efficient manner. A projection screen incorporating a prism lens such as that previously described is able to control the vertical audience envelope to such an extent that the constraints imposed by such a receiver structure are easily accommodated. FIG. 5A illustrates a portion of a prism lens 35 that would provide the desired audience envelope for a situation in which the incoming ray path from mirror 31 is 12° below horizontal. Illustratively, the facets 36 and 37 of the prism elements are shown as having angles of $\phi 36 = 40°$ and $\phi 37 = 44.3°$ from vertical, respectively.

A receiver such as illustrated in FIG. 5 has an added advantage in that the light emanating from the lens assembly 39 is directed away from the screen 34, thereby reducing the stray light that reaches screen 34.

The previously described prism lenses 20 and 35 will reflect light from the red, green and blue kinescopes through different angles, since the prism's index of refraction is dependent on the wavelength of the incoming light. This may result in different vertical shifts in the positions of the different color components at a given location on the screen. Although the amount of vertical color shift is not great, the resultant effect may be noticeable as color fringing to a viewer.

In order to correct the problem associated with vertical color shift, it is possible to reposition the location of the red and blue kinescopes, as shown in FIG. 7 in an exaggerated manner. The blue kinescope 12B and its associated lens assembly (not shown) is adjusted so that a plane 50B normal to the horizontal centerline of the kinescope faceplate is displaced or offset with respect to a plane 50G normal to the horizontal centerline of the faceplate of the green kinescope. The red kinescope is adjusted so that a plane 50R normal to the horizontal centerline of the kinescope faceplate is also displaced or offset with respect to the green kinescope normal plane 50G. As can be seen in FIG. 7B, the blue and red kinescopes are then reaimed to the original beam landing spot 59 on the screen by moving the kinescopes transversely with respect to the exit pupil of the lens, such that the central rays 60B, 60G and 60R from the blue, green and red image-producing kinescopes 32B, 32G and 32R, respectively, trace paths such as are shown in FIG. 7B in a highly exaggerated manner.

In FIGS. 7 and 7B, the displacement of the blue and red kinescopes is illustratively shown as accomplished by rotating the blue kinescope (12B, 32B) and its associated lens assembly through an angle $\theta B$ with respect to the green kinescope and rotating the red kinescope (12R, 32R) and its associated lens assembly through an angle $\theta R$ with respect to the green kinescope (12G, 32G). Illustratively, for a projection TV screen of the type shown in FIGS. 5 and 7B, $\theta B$ is of the order of 0.026° and $\theta R$ is of the order of 0.06°.

Figure 7A:
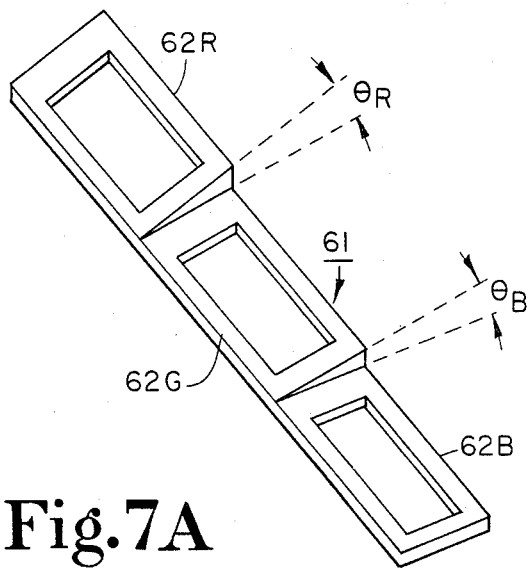
FIG. 7A is an isometric view of a projection television kinescope mounting panel constructed in accordance with the present invention.
Figure 7B:
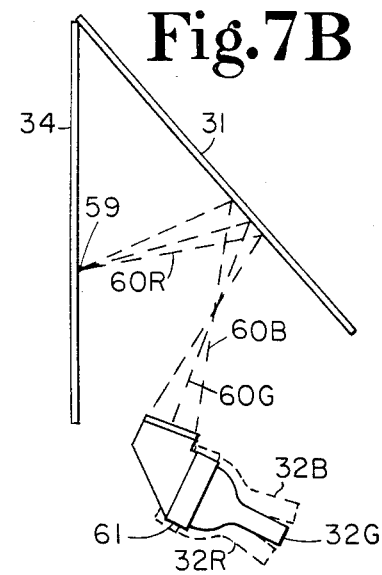
FIG. 7B is a side elevational view of a rear projection apparatus in accordance with the present invention.

Rotation of the kinescopes may be accomplished through an adjustment mechanism or may be accomplished, for example, by an arrangement such as is shown in FIG. 7A. FIG. 7A illustrates a kinescope and lens assembly mounting panel 61, which is located between the kinescope and its associated lens assembly, as shown in FIG. 7B, and provides a rigid mounting base for those components. As shown, mounting panel 61 provides mounting members 62B, 62G and 62R providing locations for each of the three kinescopes. The mounting members 62B, 62G and 62R are disposed at different angles, shown highly exaggerated for clarity, with respect to the other mounting locations. These angles correspond to the desired rotation angles $\theta B$ and $\theta R$. In this way, the desired compensation for vertical color shift is provided during normal assembly, without requiring time consuming adjustments. Rotating the red and blue kinescopes causes the angle at which the three colors impinge upon the prism lens of the screen to be different, as shown in FIG. 7B, such that the unequal refraction by the prism lens causes the three color components leaving the prism lens to be coincident, thereby eliminating the vertical color shift. The amount of rotation or accurate movement of the red and blue kinescope relative to the green kinescope necessary to correct the vertical color shift will be dependent on several factors, among them the vertical angle of the prism elements and the incident angle of the kinescope central ray onto the screen.

Figure 6:
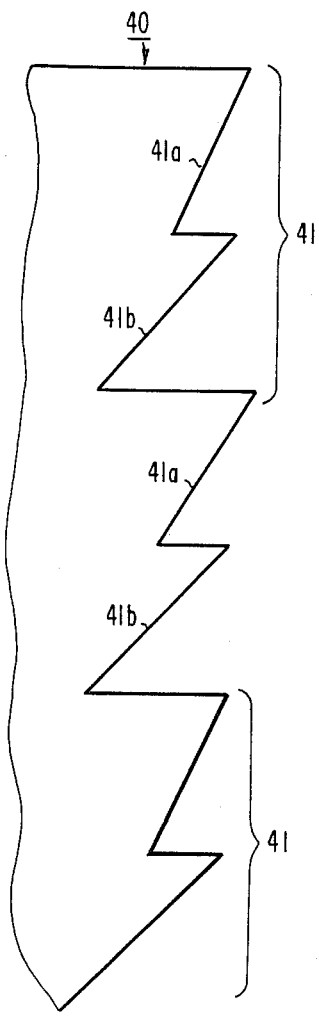
FIG. 6 is a side elevational view of a rear projection television screen, illustrating an alternate embodiment.

FIG. 6 illustrates an embodiment of a prism lens 40 in which prism element 41 comprises two subelements 41a and 41b which constitute two facets having different angles with respect to the vertical. The angle of the facets and the size of the respective facets of the prism elements can be chosen to determine the desired vertical audience envelope in a manner similar to the previously described embodiment.

What is claimed is:

1. In a rear projection television receiver incorporating a video image source and a rear projection screen comprising a field lens; a light directing prism lens comprising a plurality of horizontally disposed lens elements; and a focusing lens for focusing said directed light onto an image surface, said video image source comprising a plurality of horizontally aligned monochrome kinescopes, each of said kinescopes producing an image on a faceplate wherein a plane normal to the faceplate and passing through the horizontal centerline of at least one of said kinescopes is displaced with respect to a plane normal to the faceplate and passing through the horizontal centerline of another of said plurality of kinescopes.

2. The arrangement defined in claim 1, wherein said field lens receives light from said video image source and said light directing prism lens is disposed adjacent to said field lens.

3. The arrangement defined in claim 1, wherein each of the kinescopes of said plurality of kinescopes produces an image comprising a different color.

4. The arrangement defined in claim 3, wherein the displacement of said plane normal to the faceplate and passing through the horizontal centerline of one of said kinescopes with respect to another of said kinescopes causes light from the respective kinescope faceplates to impinge upon said rear projection screen at different angles in order to correct vertical color shift caused by unequal refraction by said light directing prism lens of the light from said different color image-producing kinescopes.

5. The arrangement defined in claim 1, wherein said plurality of monochrome kinescopes comprises a red, green and blue image-producing kinescope, respectively.

6. The arrangement defined in claim 5, wherein said plane normal to the faceplate and passing through the horizontal centerline of said red-image producing kinescope is arcuately disposed with respect to said plane normal to the faceplate and passing through the horizontal centerline of said green image-producing kinescope and said plane normal to the faceplate and passing through the horizontal centerline of said blue image-producing kinescope is arcuately disposed in an opposite direction with respect to said plane normal to the faceplate and passing through the horizontal centerline of said green image-producing kinescope.

7. The arrangement defined in claim 1, wherein said lens elements have a width of the order of 0.015 inches.

8. The arrangement defined in claim 1, wherein said light directing prism lens incorporates a plurality of prism lens elements.

9. A rear projection television receiver incorporating a video image source and a rear projection screen comprising a field lens; a light directing lens comprising a plurality of horizontally disposed lens elements, each of said lens elements incorporating means for directing light at a plurality of predetermined angles; and a focusing lens for focusing said directed light onto an image surface, said video image source comprising a plurality of horizontally aligned monochrome kinescopes, each of said kinescopes producing an image on a faceplate wherein a plane normal to the faceplate and passing through the horizontal centerline of at least one of said kinescopes is displaced with respect to a plane normal to the faceplate and passing through the horizontal centerline of another of said plurality of kinescopes, further comprising mounting means comprising a plurality of mounting locations, each of said mounting locations receiving one of said kinescopes at an angle arcuately displaced with respect to the other of said kinescopes.

10. A rear projection television receiver incorporating a video image source and a rear projection screen comprising a field lens; a light directing lens comprising a plurality of horizontally disposed lens elements, each of said lens elements incorporating means for directing light at a plurality of predetermined angles; and a focusing lens for focusing said directed light onto an image surface, said video image source comprising a plurality of horizontally aligned monochrome kinescopes, each of said kinescopes producing an image on a faceplate wherein a plane normal to the faceplate and passing through the horizontal centerline of at least one of said kinescopes is displaced with respect to a plane normal to the faceplate and passing through the horizontal centerline of another of said plurality of kinescopes wherein said means for directing light comprises a plurality of facets, said facets forming different angles with respect to a vertical plane.

11. The arrangement defined in claim 10, wherein said plurality is two.

12. A rear projection television receiver incorporating a video image source and a rear projection screen comprising a field lens; a light directing lens comprising a plurality of horizontally disposed lens elements, each of said lens elements incorporating means for directing light at a plurality of predetermined angles; and a focusing lens for focusing said directed light onto an image surface, said video image source comprising a plurality of horizontally aligned monochrome kinescopes, each of said kinescopes producing an image on a faceplate wherein a plane normal to the faceplate and passing through the horizontal centerline of at least one of said kinescopes is displaced with respect to a plane normal to the faceplate and passing through the horizontal centerline of another of said plurality of kinescopes, wherein said means for directing light comprises a single facet and wherein a plurality of predetermined numbers of said lens elements comprise means for directing light comprising facets forming respectively different angles with 13. In a rear projection television receiver incorporating a rear projection screen comprising a field lens receiving light from a video image source for substantially collimating said light, said video image source comprising a plurality of horizontally aligned different color-producing monochrome kinescopes; a prism lens disposed adjacent to said field lens for receiving light from said field lens and comprising a plurality of horizontally disposed prism lens elements, said prism lens elements refracting light from said kinescopes respectively through unequal angles; and a focusing lens for receiving and focusing said directed light from said prism lens onto an image surface, each of said kinescopes producing an image on a faceplate wherein a plane normal to the faceplate and passing through the horizontal centerline of at least one of said kinescopes is displaced with respect to a plane normal to the faceplate and passing through the horizontal centerline of another of said plurality of kinescopes, in order to compensate for said unequal refraction of said light from said kinescopes.

* * * * *

UNITED STATES PATENT AND TRADEMARK OFFICE
CERTIFICATE OF CORRECTION

PATENT NO. : 4,544,946

DATED : October 1, 1985

INVENTOR(S) : Bertram VanBreemen

It is certified that error appears in the above-identified patent and that said Letters Patent is hereby corrected as shown below:

Column 8, line 44, after "with" insert -- respect to a vertical plane.--

Signed and Sealed this

Eighth Day of April 1986

[SEAL]

Attest:

DONALD J. QUIGG

Attesting Officer

Commissioner of Patents and Trademarks